(12) United States Patent
Grandidge et al.

(10) Patent No.: US 12,541,062 B2
(45) Date of Patent: Feb. 3, 2026

(54) HYBRID FIBER CONNECTOR

(71) Applicant: Ortronics, Inc., New London, CT (US)

(72) Inventors: Ryan J. Grandidge, Wakefield, CT (US); Daniel M. Smith, Providence, RI (US); Thomas Knychalski, Providence, RI (US)

(73) Assignee: Legrand DPC, LLC, West Hartford, CT (US)

( * ) Notice: Subject to any disclaimer, the term of this patent is extended or adjusted under 35 U.S.C. 154(b) by 293 days.

(21) Appl. No.: 18/215,364

(22) Filed: Jun. 28, 2023

(65) Prior Publication Data

US 2024/0004146 A1  Jan. 4, 2024

Related U.S. Application Data

(60) Provisional application No. 63/357,187, filed on Jun. 30, 2022.

(51) Int. Cl.
G02B 6/38 (2006.01)

(52) U.S. Cl.
CPC ......... *G02B 6/3825* (2013.01); *G02B 6/3817* (2013.01)

(58) Field of Classification Search
CPC .................................................. G02B 6/3817
See application file for complete search history.

(56) References Cited

U.S. PATENT DOCUMENTS

2011/0200286 A1  8/2011  Smith et al.
2014/0219615 A1  8/2014  Petersen et al.
2016/0062047 A1  3/2016  Shimazu et al.
2016/0139347 A1* 5/2016  Petersen ............. G02B 6/3895
                                                    385/139
2022/0317384 A1  10/2022 Qi et al.

FOREIGN PATENT DOCUMENTS

CN          113270758 A      8/2021

OTHER PUBLICATIONS

LC Connectors and Adapters: LC Designed for Data Centers, LC Connector Series, Senko Advanced Components (2023), available at https://www.senko.com/product-category/interconnect/lc-connector-series/ <https://protect-us.mimecast.com/s/EmumC4xJ16t6rRXniO8udE?domain=senko.com/>.
Single Pair Ethernet: Single Pair Ethernet, Panduit Corp. (2023), available at https://www.panduit.com/en/landing-pages/single-pair-ethernet.html <https://protect-us.mimecast.com/s/dso6C5yg27sRAwBziO2PL6?domain=panduit.com>.

(Continued)

*Primary Examiner* — Sung H Pak
(74) *Attorney, Agent, or Firm* — McCarter & English, LLP

(57) ABSTRACT

An example hybrid fiber connector is provided. The hybrid fiber connector includes a housing defining a proximal end and an opposing distal end. The housing includes at least one wall. The hybrid fiber connector includes a ferrule disposed at the proximal end of the housing, and at least one contact pad coupled to the at least one wall of the housing. Upon insertion into a port of a complementary adapter, the ferrule is capable of completing an optical connection and the at least one contact pad is capable of completing an electrical connection.

20 Claims, 16 Drawing Sheets

(56) References Cited

OTHER PUBLICATIONS

SN Connectors and Adapters: SN Connectors, SN Series, Senko Advanced Components (2023), available at https://www.senko.com/product-category/interconnect/sn-connector-series/ <https://protect-us.mimecast.com/s/PLOxC68j3WiMXZ5gumfi36?domain=senko.com/>.

MDC Connectors and Adapters: MDC Connectors, Featured Product: Very Small Form Factor, US Conec (2023), available at https://www.usconec.com/featured-products/mdc-connectors <https://protect-us.mimecast.com/s/WxbaC73kg9lyLnD0uNybeL?domain=usconec.com>.

CS Connectors and Adapters: Premium CS Connector, CS Series, Senko Advanced Components (2023), available at https://www.senko.com/product-category/interconnect/cs-connector-series/ <https://protect-us.mimecast.com/s/_sadC821j3HQ9BoAcodSdJ?domain=senko.com/>.

Extended Search Report from related European Patent Application No. 23182134.9 issue Oct. 30, 2023.

\* cited by examiner

HYBRID FIBER CONNECTOR

CROSS-REFERENCE TO RELATED APPLICATIONS

This application claims the benefit of a commonly assigned U.S. Provisional Patent Application No. 63/357,187, which was filed on Jun. 30, 2022. The entire content of the foregoing provisional application is incorporated herein by reference.

BACKGROUND

A variety of connectors are used in the telecommunications industry. Copper connectors can be used to transmit power and/or data across the connector interface. For example, FIGS. 1 and 2 illustrate a traditional single-pair Ethernet port 10 and a complementary single-pair Ethernet connector 30 that rely on copper connectors for transmission of data and power. In particular, the interior of the port 10 includes electrical contacts 12, 14 and the side surfaces of the port 10 include electrical contacts 16, 18. The connector 30 includes a front face with openings 32, 34 each including electrical contacts 36, 38 for mating with the contacts 12, 14 of the port 10. The connector 30 further includes electrical contacts 40 on opposing side surfaces for mating with the contacts 16, 18 of the port 10. Upon mating of the connector 30 with the port 10, data and/or power can be transmitted along mated contacts 12, 14, 36, 38, and the mated contacts 16, 18, 40 provide a shielding contact for the connector 30. However, transmitting both power and data over the same copper-based connector 30 can result in crosstalk, resulting in a reduction in signal quality. Additional components may be added to the connector assembly for reduction of crosstalk, resulting in increased fabrication/assembly costs and a potential increase in maintenance costs.

Optical fiber connectors have been used in the industry for data transmission and generally provide for a higher data bandwidth than traditional copper bandwidth. However, power cannot be transmitted over optical fibers. FIGS. 3 and 4 illustrate a traditional fiber optic port 50 and a complemental fiber optic connector 80. The port 50 generally includes a housing 52 without any electrical contacts, and an opening 54 sized to receive a complementary ferrule 82 of the connector 80. A dust cap installed in the opening 54 would be removed prior to insertion of the connector 80 into the port 50. The housing 84 of the connector 80 similarly does not include any electrical contacts, and instead the connection between the connector 80 and port 50 is solely based on the optical fiber connection for data transmission. As such, power cannot be transmitted using the traditional fiber optic connector 80.

SUMMARY

Embodiments of the present disclosure provide an exemplary hybrid fiber connector. In some embodiments, the exemplary connector can be a hybrid rectilinear connector that allows for electrical signals to be transmitted through the same connection as a standard rectilinear fiber connector without losing the fiber optic capability. In some embodiments, the housing of the exemplary connector can define a rectilinear configuration having at least one substantially flat or planar surface that receives one or more electrical contacts. In some embodiments, the housing of the exemplary connector can define one or more curved surfaces capable of receiving one or more electrical contacts. The exemplary connector includes a fiber optic connection in combination with wiping contacts for transmission of data across the fiber optic connection and transmission of power across the wiping contacts. Fiber is therefore used for the data transmission and copper is used for power transmission. In some embodiments, the wiping contacts can be used for transmission of an electrical signal in the form of power, data, or control. The combination allows for higher data bandwidth without the drawback of electromagnetic interference, crosstalk and/or distance limitations encountered in traditional connectors. In particular, the combination of fiber with copper for data and power transmission can have reduced crosstalk typically encountered in traditional copper connectors that handle power and data across the connector interface. The exemplary connector thereby provides for improved signal and power transmission in a single interface.

In accordance with embodiments of the present disclosure, an exemplary hybrid fiber connector is provided. The hybrid fiber connector includes a housing defining a proximal end and an opposing distal end. The housing includes at least one wall. The hybrid fiber connector includes a ferrule disposed at the proximal end of the housing, and at least one contact pad coupled to the at least one wall of the housing. Upon insertion into a port of a complementary adapter, the ferrule is capable of completing an optical connection and the at least one contact pad is capable of completing an electrical connection.

In some embodiments, the housing can be a rectilinear housing. In some embodiments, the at least one wall of the housing can include a bottom wall, first and second side walls extending from the bottom wall, and a top wall. In some embodiments, the at least one contact pad can include a first contact pad coupled to bottom wall of the housing, a second contact pad coupled to the first side wall of the housing, and a third contact pad coupled to the second side wall of the housing. In some embodiments, the at least one contact pad can include a first contact pad, a second contact pad, and a third contact pad coupled to the bottom wall of the housing in a spaced manner. In some embodiments, the first, second and third contact pads can be electrically and mechanically isolated from each other. In some embodiments, the first, second and third contact pads can be electrically and mechanically connected to each other. In some embodiments, the at least one contact pad can be a copper, wiping contact pad.

Upon insertion into the port of the complementary adapter, the ferrule is capable of completing the optical connection for transmission of data (e.g., with a second connector connected to the adapter on an opposing side of the first connector). Upon insertion into the port of the complementary adapter, the at least one contact pad is capable of competing the electrical connection for transmission of power (e.g., with a second connector connected to the adapter on an opposing side of the first connector).

The at least one contact pad can extend at least partially along an outer surface of the at least one wall of the housing. The at least one wall of the housing can include a recessed groove configured and dimensioned to receive the at least one contact pad. The recessed groove can receive the at least one contact pad such that an outer surface of the at least one contact pad is aligned with a plane defined by an outer surface of the at least one wall of the housing.

In accordance with embodiments of the present disclosure, an exemplary hybrid fiber connector system is provided. The system includes an adapter and a hybrid fiber connector. The adapter includes a housing defining opposing first and second ends, a first port formed in the first end of the housing, a second port formed in the second end of the housing, at least one contact pad coupled to the housing and extending from the first port to the second port, and at least one optical guide disposed between the first and second ports within the housing. The hybrid fiber connector includes a housing defining a proximal end and an opposing distal end. The housing includes at least one wall. The hybrid fiber connector includes a ferrule disposed at the proximal end of the housing, and at least one contact pad coupled to the at least one wall of the housing. Upon insertion of the hybrid fiber connector into the first or second port of the adapter, the ferrule of the hybrid fiber connector is disposed at least partially within the at least one optical guide and is capable of completing an optical connection. Upon insertion of the hybrid fiber connector into the first or second port of the adapter, the at least one contact pad of the hybrid fiber connector mates with the at least one contact pad of the adapter and is capable of completing an electrical connection.

In some embodiments, the housing of the adapter can include a bottom wall, a first side wall and a second side wall extending from the bottom wall, and a top wall. In some embodiments, the at least one contact pad can include a first contact pad coupled to the first side wall of the housing of the adapter, a second contact pad coupled to the bottom wall of the housing of the adapter, and a third contact pad coupled to the second side wall of the housing of the adapter. In some embodiments, the at least one contact pad can include a first contact pad, a second contact pad, and a third contact pad coupled to the bottom wall of the housing of the adapter in a spaced manner.

The adapter can include a central wall extending perpendicularly within the housing between the first and second ports. The at least one optical guide extends through the central wall. The housing can include a recessed groove extending from the first port to the second port through the central wall. The recessed groove is configured and dimensioned to receive the at least one contact pad such that the at least one contact pad extends from the first port to the second port through the central wall.

In accordance with embodiments of the present disclosure, an exemplary method of simultaneously transmitting data and power is provided. The method includes inserting a proximal end of a hybrid fiber connector into a port of a complementary adapter. The hybrid fiber connector includes a housing defining the proximal end and an opposing distal end. The housing includes at least one wall. The hybrid fiber connector includes a ferrule disposed at the proximal end of the housing, and at least one contact pad coupled to the at least one wall of the housing. The method includes creating an optical connection within the port with the ferrule of the hybrid fiber connector. The method includes creating an electrical connection within the port with the at least one contact pad of the hybrid fiber connector.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the hybrid rectilinear fiber connector, reference is made to the accompanying figures, wherein.

DETAILED DESCRIPTION

Figure 1:
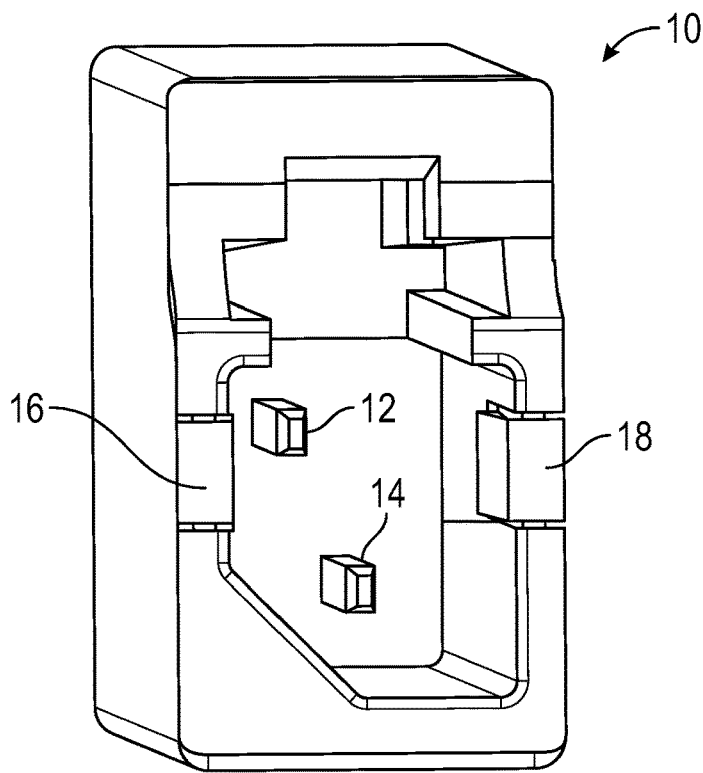
FIG. 1 is a perspective view of a traditional Ethernet port.
Figure 2:
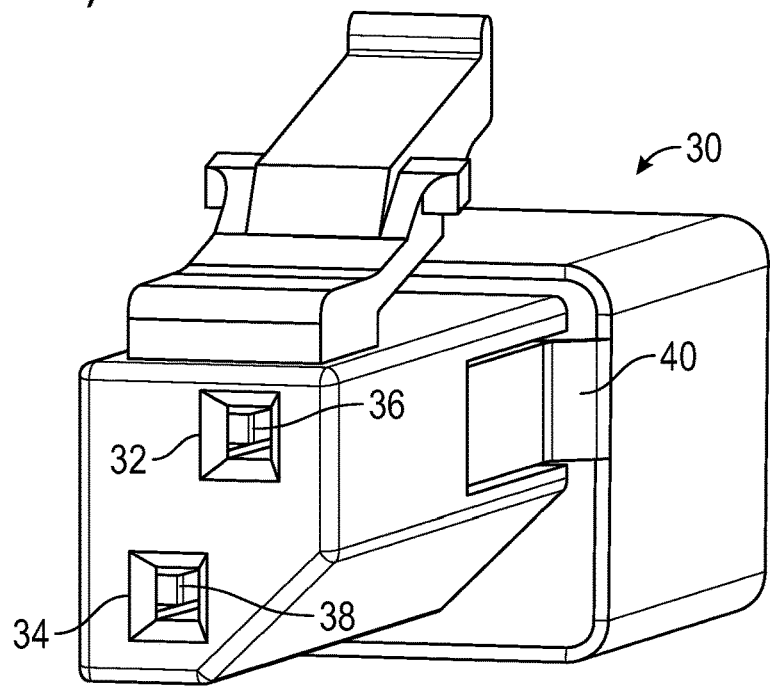
FIG. 2 is a perspective view of a traditional Ethernet connector.
Figure 3:
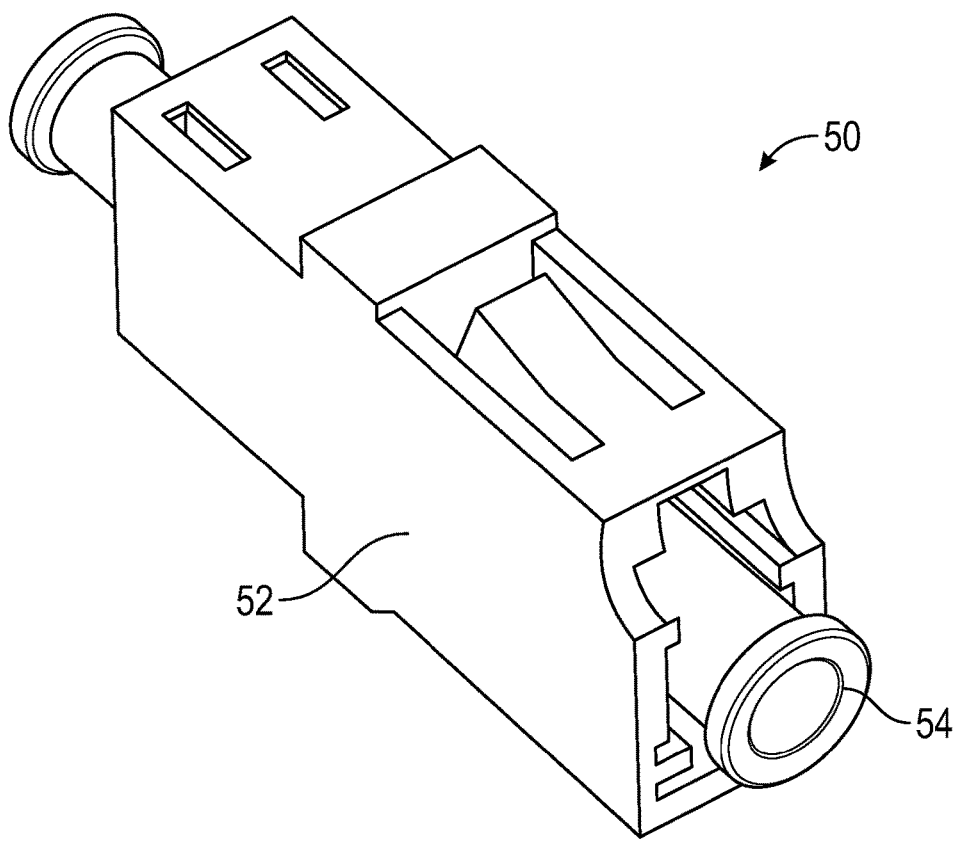
FIG. 3 is a perspective view of a traditional fiber optic port.
Figure 4:
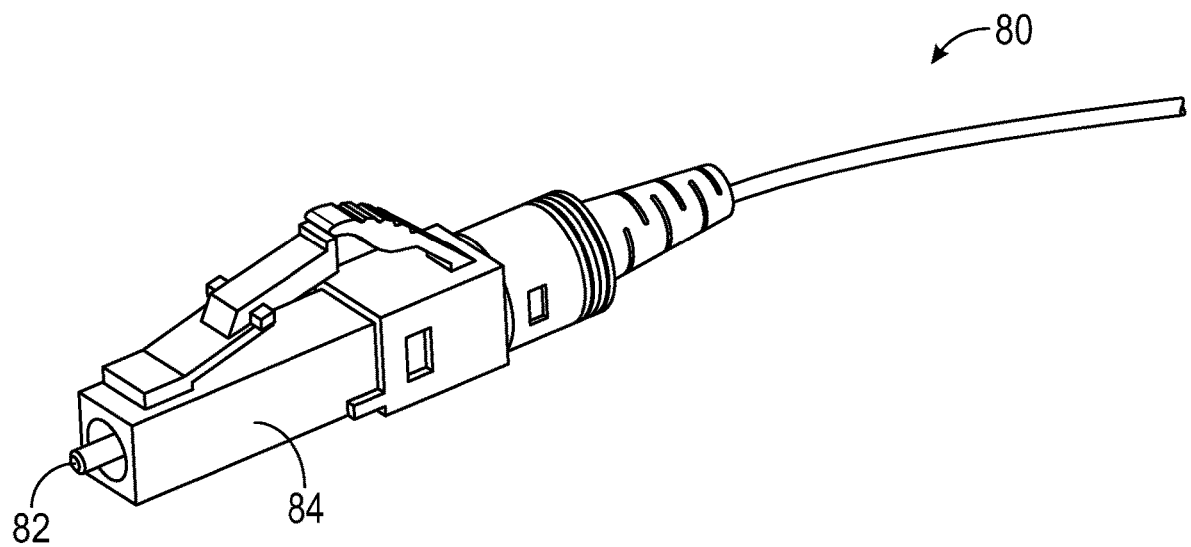
FIG. 4 is a perspective view of a traditional fiber optic connector.
Figure 5:
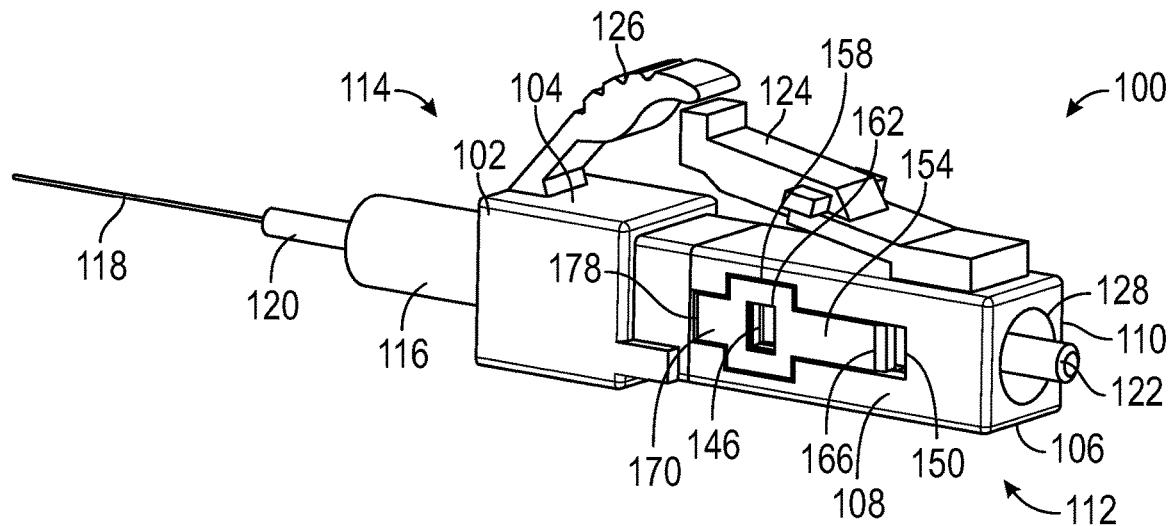
FIG. 5 is a left side, perspective view of a hybrid fiber connector in an exemplary embodiment.
Figure 6:
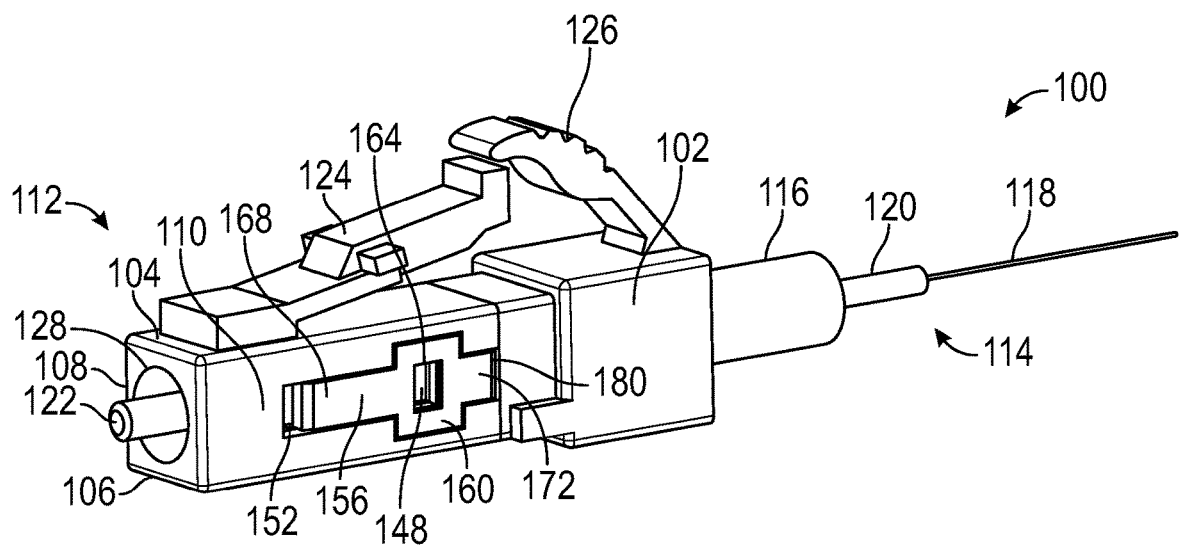
FIG. 6 is a right side, perspective view of a hybrid fiber connector of FIG. 5.
Figure 7:
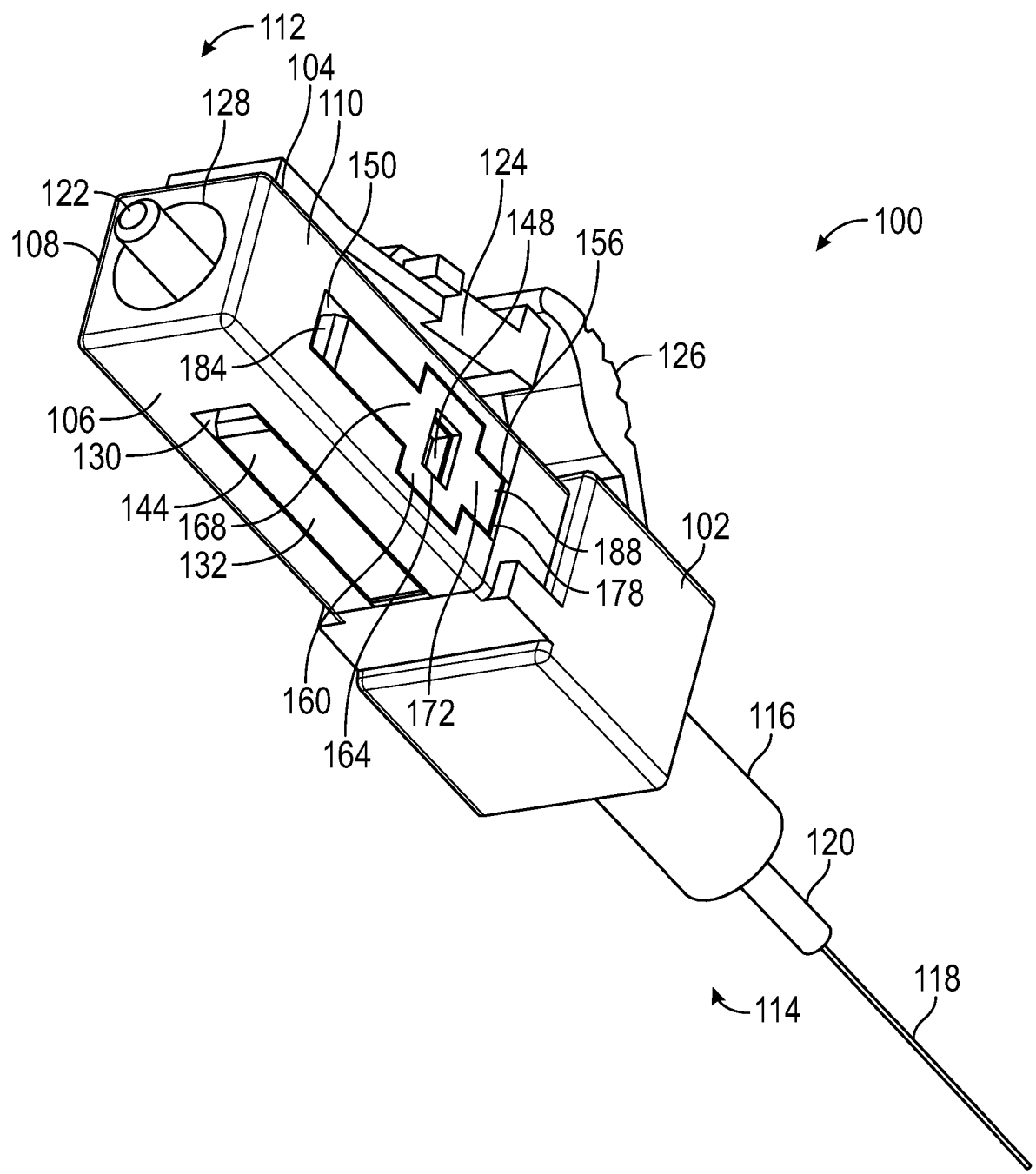
FIG. 7 is a bottom perspective view of a hybrid fiber connector of FIG. 5.
Figure 8:
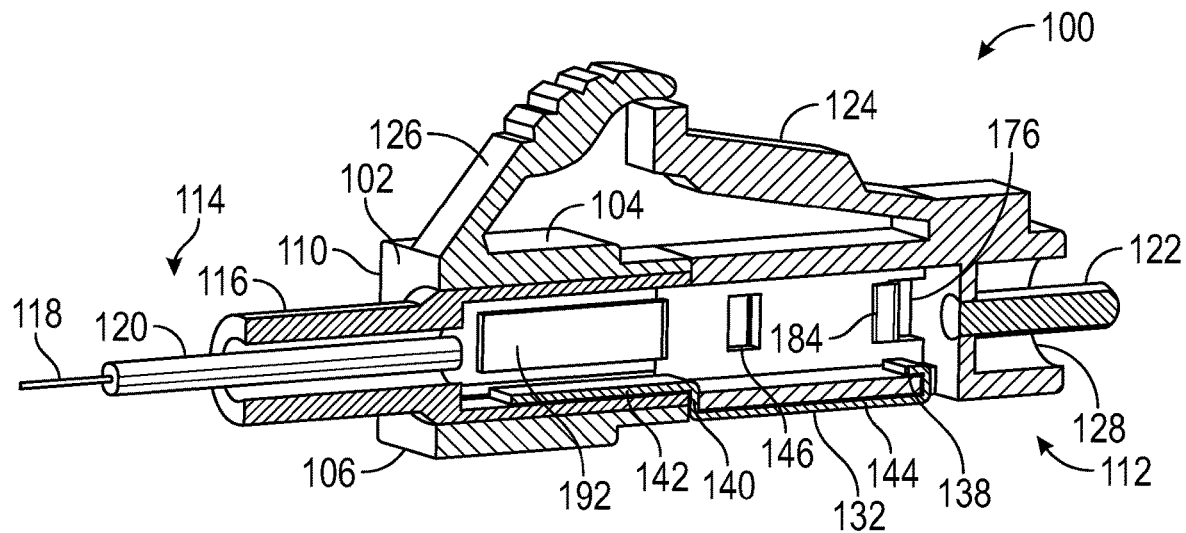
FIG. 8 is a cross-sectional, perspective view of a hybrid fiber connector of FIG. 5.
Figure 9:
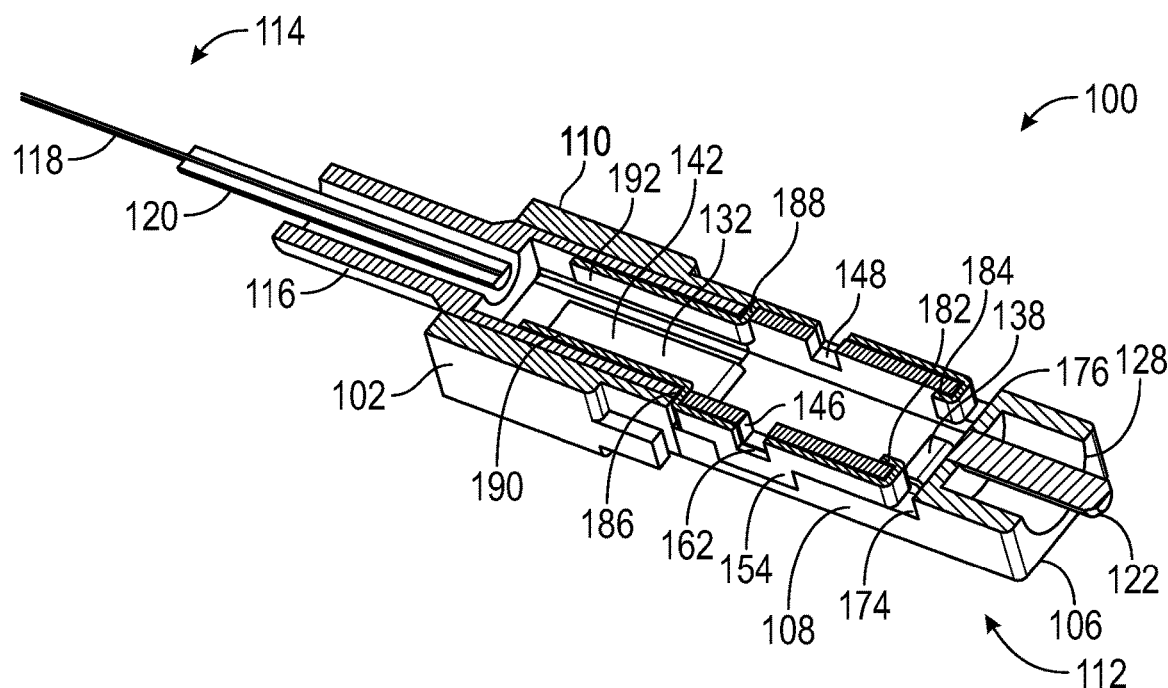
FIG. 9 is a cross-sectional, perspective view of a hybrid fiber connector of FIG. 5.
Figure 10:
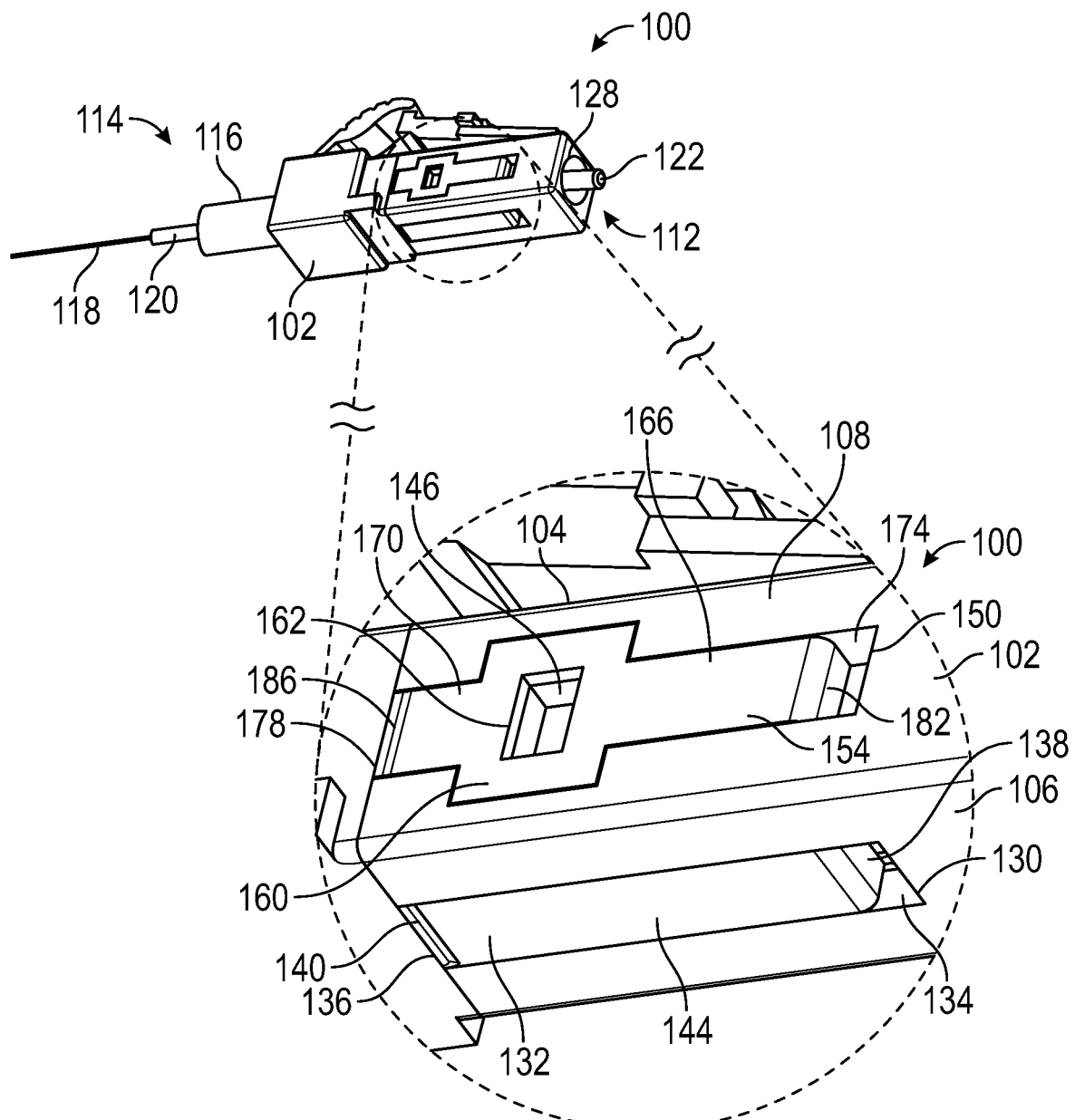
FIG. 10 is a perspective and detailed view of a hybrid fiber connector of FIG. 5.

FIGS. 5-10 are perspective, cross-sectional and detailed views of an exemplary hybrid fiber connector 100 (hereinafter "connector 100"). In some embodiments, the connector 100 can be an LC connector. The connector 100 includes a housing 102 that, in some embodiments, can define a rectilinear configuration. For example, the housing 102 can include a general structure having opposing top and bottom walls 104, 106 that are substantially parallel to each other, and opposing side walls 108, 110 that are substantially parallel to each other. The walls 104, 106, 108, 110 can define substantially planar or flat surfaces. Although the connector 100 includes a substantially rectilinear configuration, it should be understood that the exemplary features discussed herein can be incorporated into a connector having a different configuration. The connector 100 generally defines a proximal end 112 configured to be received within a complementary adapter or plug, and an opposing distal end 114 connected to a fiber optic cable.

The housing 102 includes a hollow interior configured and dimensioned to receive various components of the connector 100 subassembly. A crimp eyelet or boot 116 can be partially disposed within the housing 102 and partially extends from the distal end 114 of the connector 100. The boot 116 includes a central opening that receives therethrough the optical fiber 118 and cladding 120 disposed around the optical fiber 118. For clarity, the internal components of the subassembly are not illustrated. However, the optical fiber 118 extends through the interior of the housing 102 and is optically and communicatively connected to a ferrule 122 extending from the proximal end 112 of the connector 100. The top of the housing 102 includes a locking/latching mechanism 124 for snapping engagement with complementary structures within an adapter or plug, and a release lever 126 for disengaging the locking/latching mechanism 124 from the corresponding adapter or plug. The housing 102 includes an opening 128 formed around the ferrule 122 at the proximal end 112. The opening 128 can be configured and dimensioned to receive a complementary structure within the adapter or plug during mating, and assists with alignment of the ferrule 122 with the adapter or plug.

The bottom wall 106 can include a recessed slot or groove 130 formed therein and configured to receive a first electrical contact pad 132 (e.g., a metal contact pad, a copper contact pad, or the like). The housing 102 includes a first opening 134 at a proximal end of the groove 130 and a second opening 136 at a distal end of the groove 130, both openings 134, 136 extending into the interior of the housing 102 (see, e.g., FIG. 10). A proximal end 138 of the contact pad 132 can pass through the opening 134 and wraps around the edge of the opening 134 within the interior of the housing 102. The opposing end of the contact pad 132 can pass through the opening 136 to define an S-shaped section 140 that wraps around a step in the housing 102. A distal end 142 of the contact pad 132 extends from the section 140 within the interior of the housing 102. As such, a central section 144 of the contact pad 132 remains on the exterior of the housing 102 within the groove 130, while the proximal and distal ends of the contact pad 132 are disposed within the housing 102. In some embodiments, the contact pad 132 can generally define an equal width along the entire length of the contact pad 132. The groove 130 can be dimensioned to receive the contact pad 132 such that the central section 144 is substantially aligned with the outer surface of the bottom wall 106 (e.g., not protruding beyond the plane defined by the outer surface of the bottom wall 106).

Each of the side walls 108, 110 can include an opening 146, 148 formed therein. The walls 108, 110 also include recessed slots or grooves 150, 152 formed therein and configured to receive respective second and third electrical contact pads 154, 156 in a similar manner as the contact pad 132 received in the groove 130. The contact pads 154, 156 can each include a central section exposed on the outer surface of the housing 102, including a central block section 158, 160 with an opening 162, 164 complementary to the opening 146, 148, a proximal extension 166, 168, and a distal extension 170, 172. The block sections 158, 160 and extensions 166, 168, 170, 172 fit within the respective grooves 150, 152 such that the contact pad 154, 156 aligns with the plane defined by the respective outer surfaces of the walls 108, 110.

The grooves 150, 152 each include an opening 174, 176 at a proximal end and an opening 178, 180 at a distal end extending into the interior of the housing 102. Proximal ends 182, 184 of the contact pads 154, 156 extend through the respective openings 174, 176 and wrap around an edge of the housing 102 to secure the contact pad 154, 156 in place. An S-shaped section 186, 188 of the contact pads 154, 156 passes through the respective opening 178, 180, and distal ends 190, 192 of the contact pads 154, 156 extend within the interior of the housing 102 from the sections 186, 188. The housing 102 of the connector 100 therefore includes three surfaces along walls 106, 108, 110 with contact pads 132, 154, 156 exposed. The contact pads 132, 154, 156 allow for electrical copper contact during mating of the connector 100 with complementary electrical contacts of a plug or adapter for power transfer (e.g., wiping contact). In some embodiments, the contact pads 132, 154, 156 can be physically/electrically connected to each other (e.g., a duplex LC connector for fiber-based Power-over-Internet (POE) solutions for Internet-of-Things (IoT), or the like). In some embodiments, the contact pads 132, 154, 156 can be physically/electrically isolated from each other (e.g., a simplex LC connector for FTTx applications, single pair Ethernet with bi-directional optical transmission applications, or the like).

Figure 11:
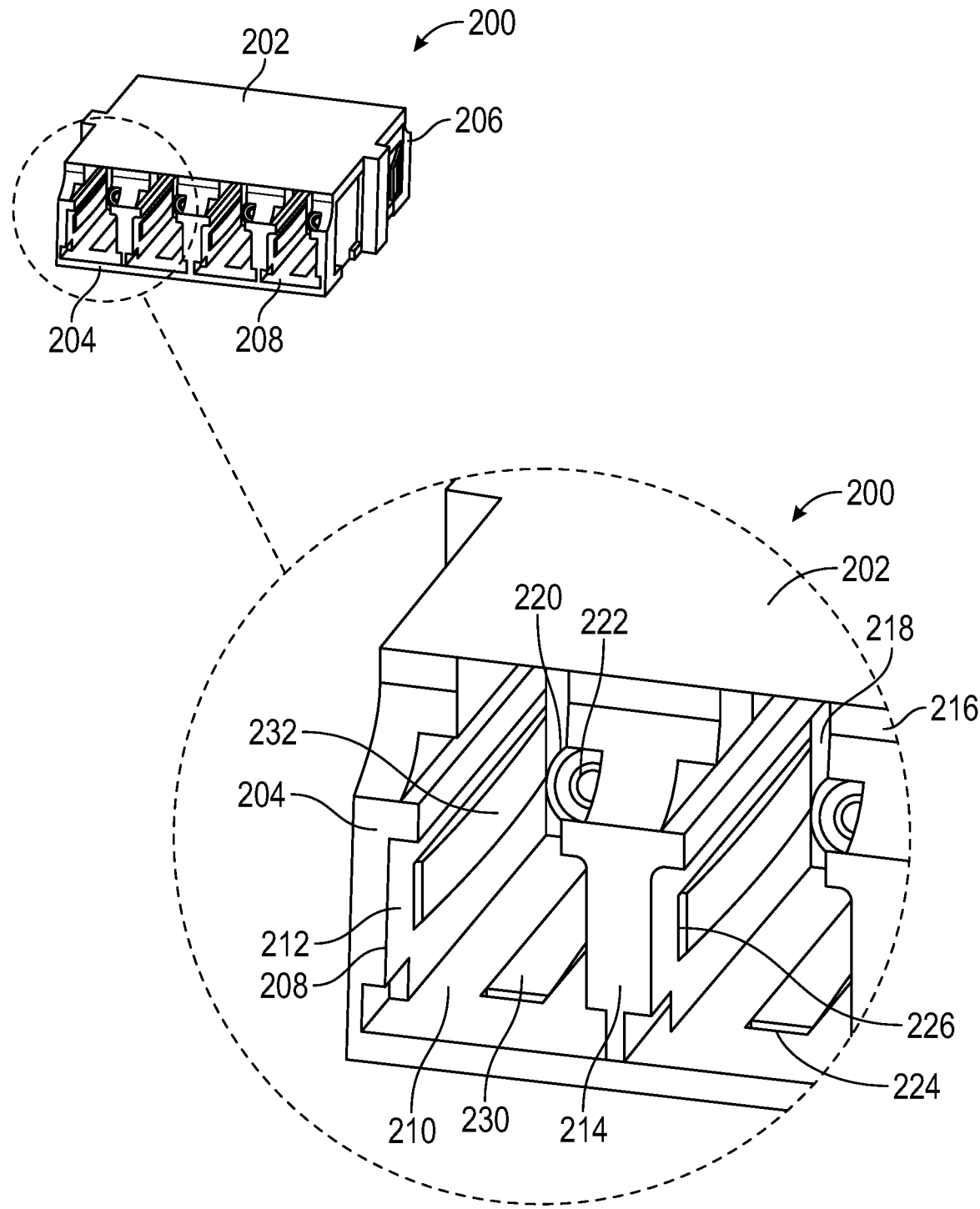
FIG. 11 is a perspective and detailed view of a hybrid fiber connector adapter in an exemplary embodiment.
Figure 12:
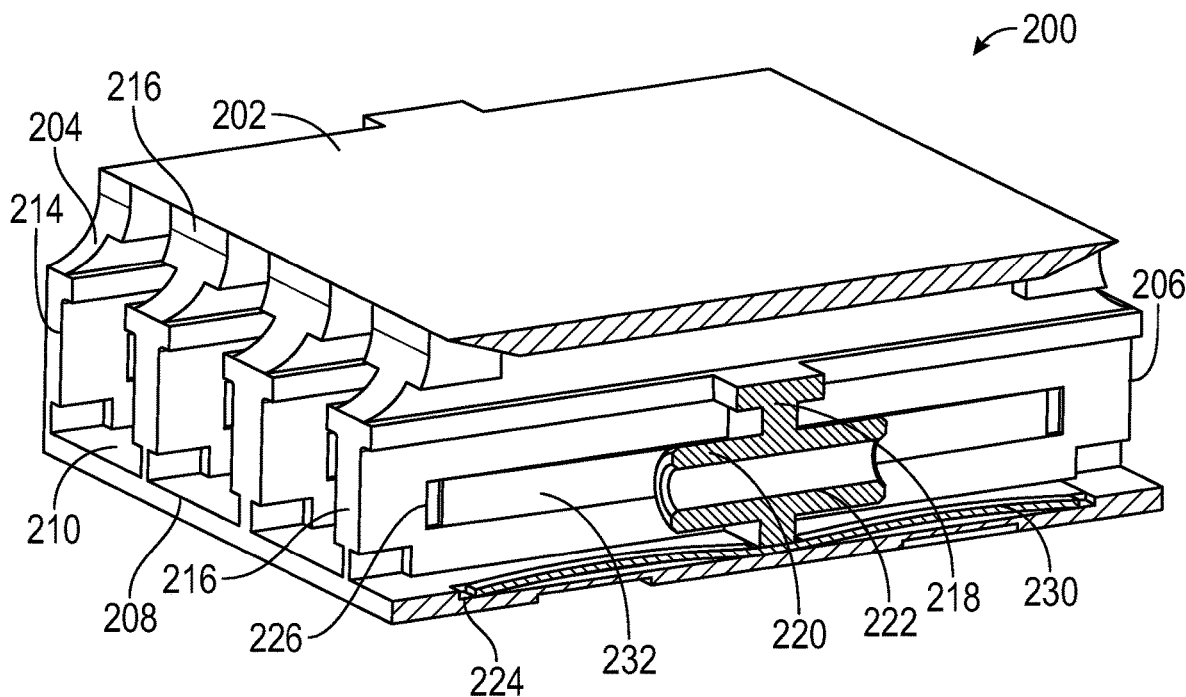
FIG. 12 is a cross-sectional, perspective view of a hybrid fiber connector adapter of FIG. 11.
Figure 13:
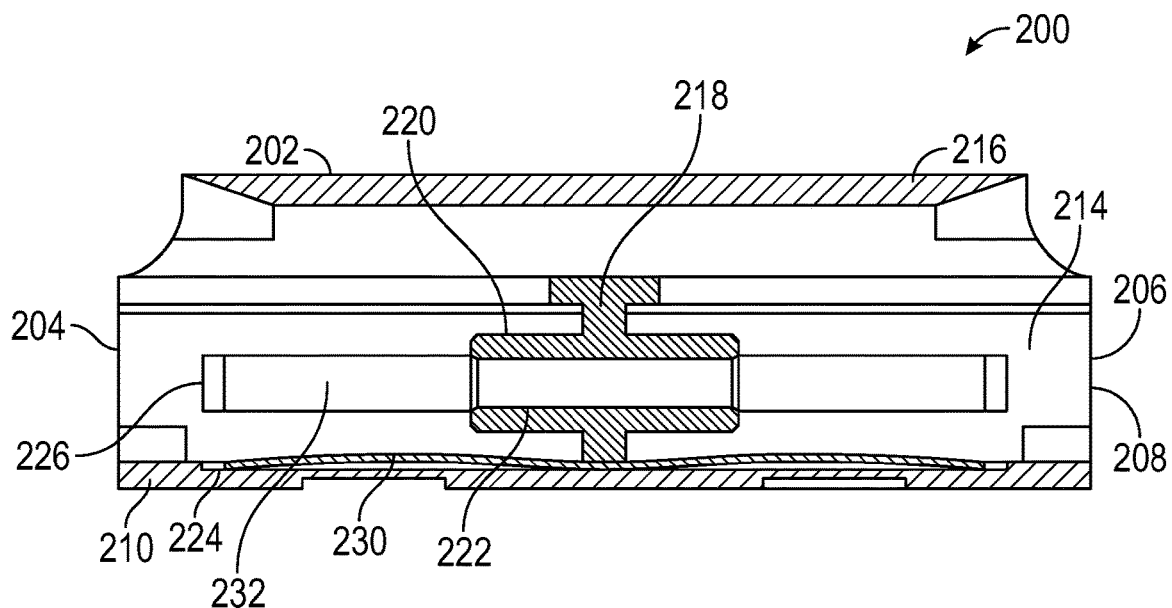
FIG. 13 is a cross-sectional, side view of a hybrid fiber connector adapter of FIG. 11.
Figure 14:
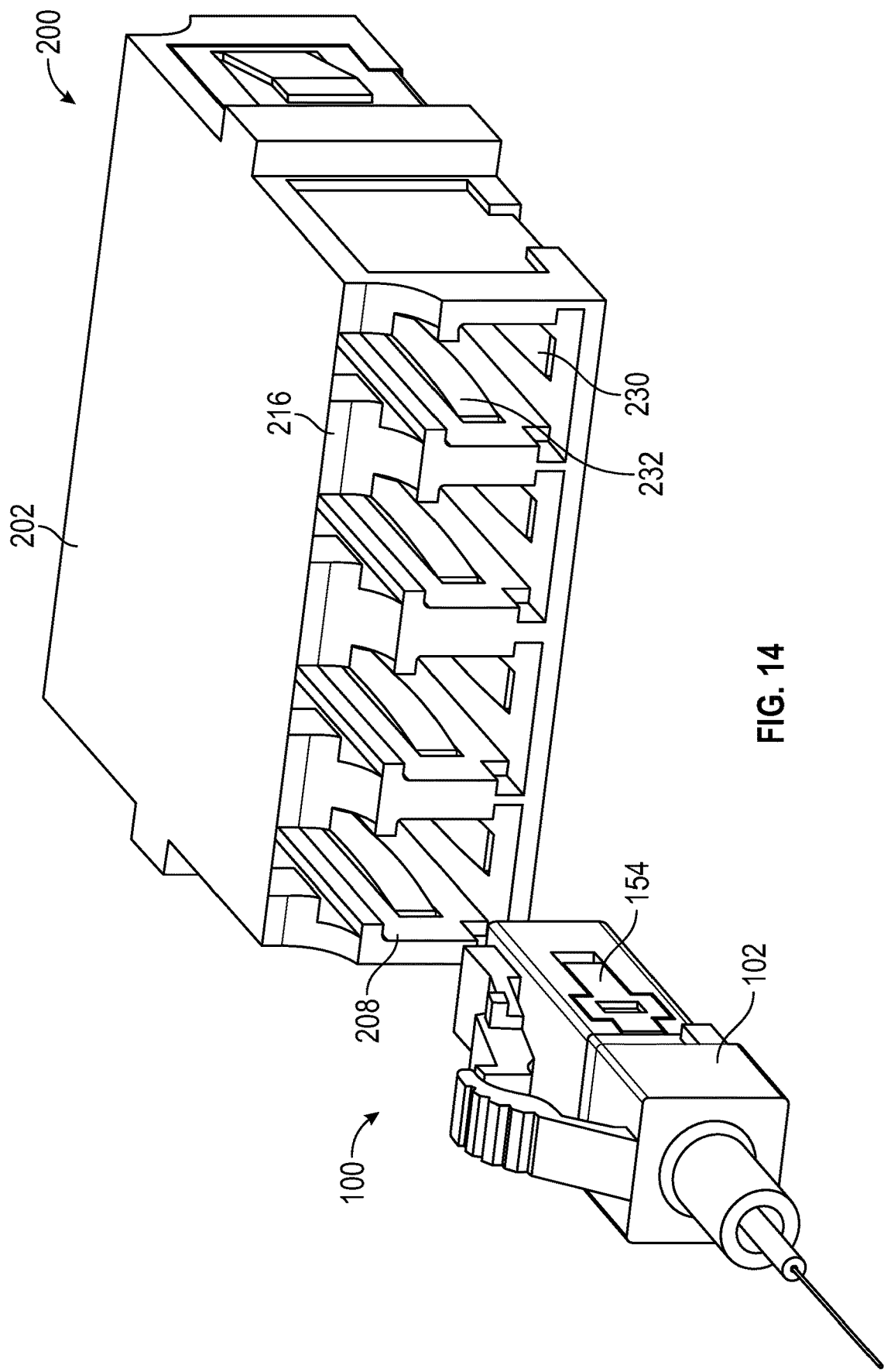
FIG. 14 is a perspective view of a hybrid fiber connector system in an exemplary embodiment, including a hybrid fiber connector of FIG. 5 and a hybrid fiber connector adapter of FIG. 11.
Figure 15:
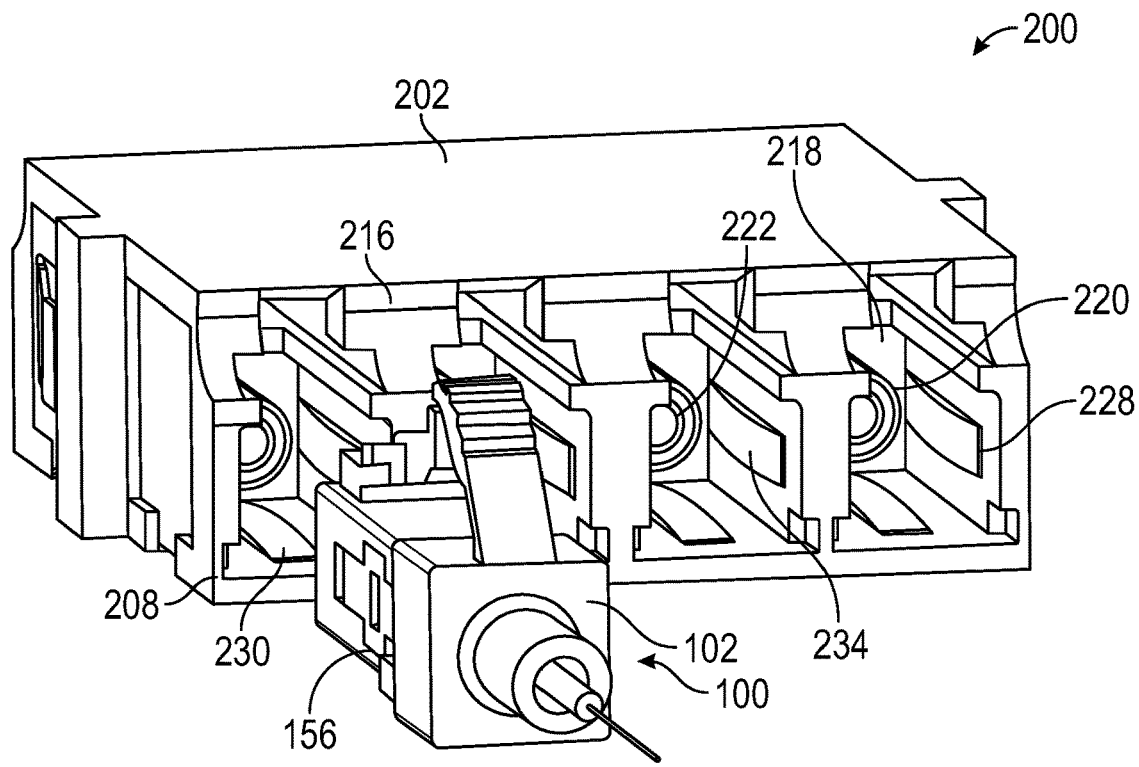
FIG. 15 is a left side, perspective view of a hybrid fiber connector system of FIG. 14.
Figure 16:
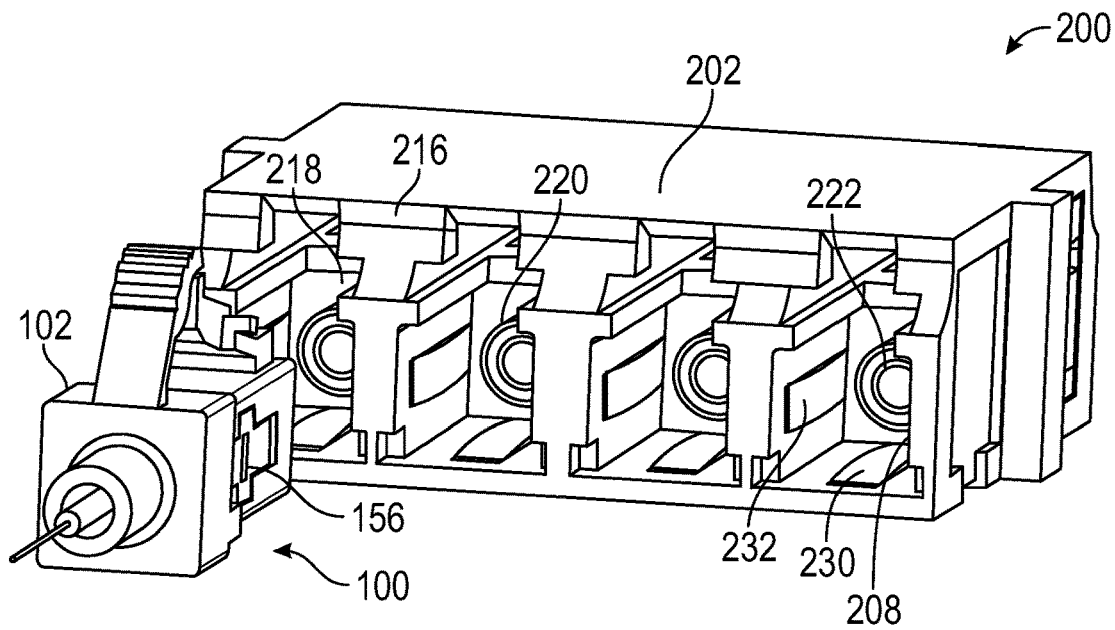
FIG. 16 is a right side, perspective view of a hybrid fiber connector system of FIG. 14.
Figure 17:
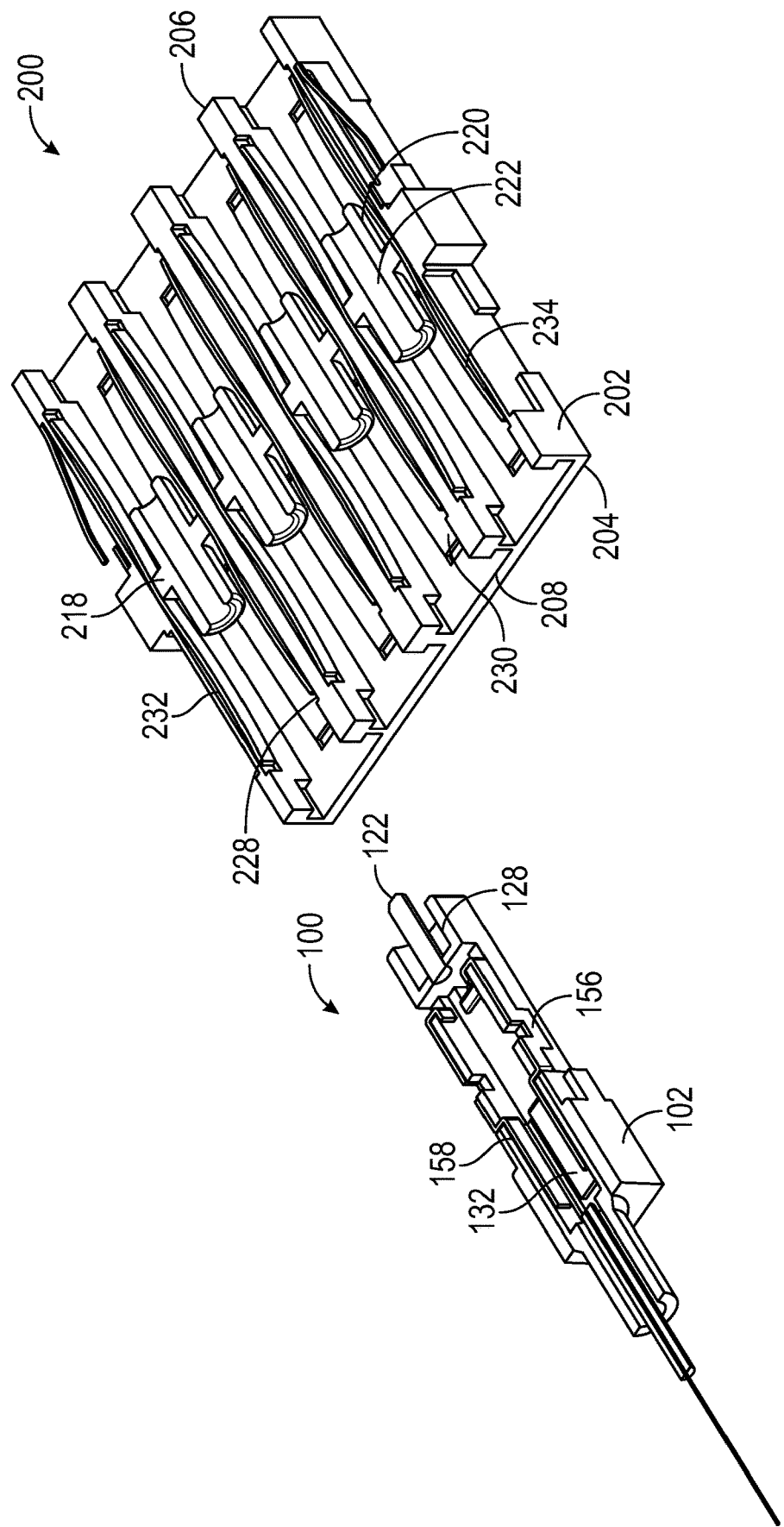
FIG. 17 is a cross-sectional, perspective view of a hybrid fiber connector system of FIG. 14.

FIGS. 11-13 are perspective and cross-sectional views of a hybrid fiber connector adapter 200 (hereinafter "adapter 200") configured to optically and electrically receive and mate with the connector 100. In some embodiments, the adapter 200 can be an LC quad adapter. The adapter 200 includes a housing 202 including opposing ends 204, 206. Each end 204, 206 of the housing 202 includes one or more openings or ports 208 configured and dimensioned to releasably receive the connector 100. Each port 208 generally includes a bottom wall 210, side walls 212, 214 extending substantially perpendicularly from the bottom wall 210, and a top wall 216. The ports 208 extend from the end 204 to the end 206 of the housing 202.

The housing 202 includes a central wall 218 that extends perpendicularly from the top wall 216 to the bottom wall 210. The housing 202 includes a guide 220 disposed centrally within each port 208 and passing through the central wall 218. The guide 220 can define a substantially cylindrical configuration, and may be integrally formed with the central wall 218. The guide 220 includes a central opening 222 extending between opposing ends. The outer diameter of the guide 220 is dimensioned to be received within the opening 128 of the connector 100, and the diameter of the opening 222 is dimensioned to receive the ferrule 122 of the connector 100 such that opposing connectors 100 received by ports 208 of the adapter 200 can be optically connected to each other.

The bottom wall 210 includes a recessed slot or groove 224 formed therein and extending through the central wall 218 underneath the guide 220 (e.g., separated from the opening 222 of the guide 224). The side walls 212, 214 similarly includes recessed slots or grooves 226, 228 that extend through the central wall 218 on opposing sides of the guide 220. Each of the grooves 224, 226, 228 is configured to receive and retain therein a respective contact pad 230, 232, 234 (e.g., copper, double-arched spring contacts). Each of the contact pads 230, 232, 234 therefore extends within the housing 202 on opposing sides of the central wall 218. As such, each port 208 includes three electrical contacts on the sides and bottom of the opening.

FIGS. 14-17 are perspective and cross-sectional views of the adapter 200 and the connector 100 (collectively referred to herein as "a hybrid fiber connector system" or "system"). Upon insertion of the connector 100 into the port 208 of the adapter 200, the ferrule 128 passes at least partially into the opening 222 of the adapter 200. Simultaneously, the contact pad 132 makes electrical, wiping contact with the contact pad 230, the contact pad 156 makes electrical, wiping contact with the contact pad 234, and the contact pad 158 makes electrical, wiping contact with the contact pad 232. When another connector 100 is inserted from the opposing side into the corresponding port 208, an optical connection is created through the ferrules 122 for transmission of data, and an electrical connection is simultaneously created through the contact pads 132, 156, 158, 230, 232, 234 for transmission of power. The system therefore allows for higher bandwidth for fiber data transmission, with simultaneous transfer of power through the copper, electrical connection, resulting in a hybrid connection system without the crosstalk issues typically observed with use of traditional connection systems.

Figure 18:
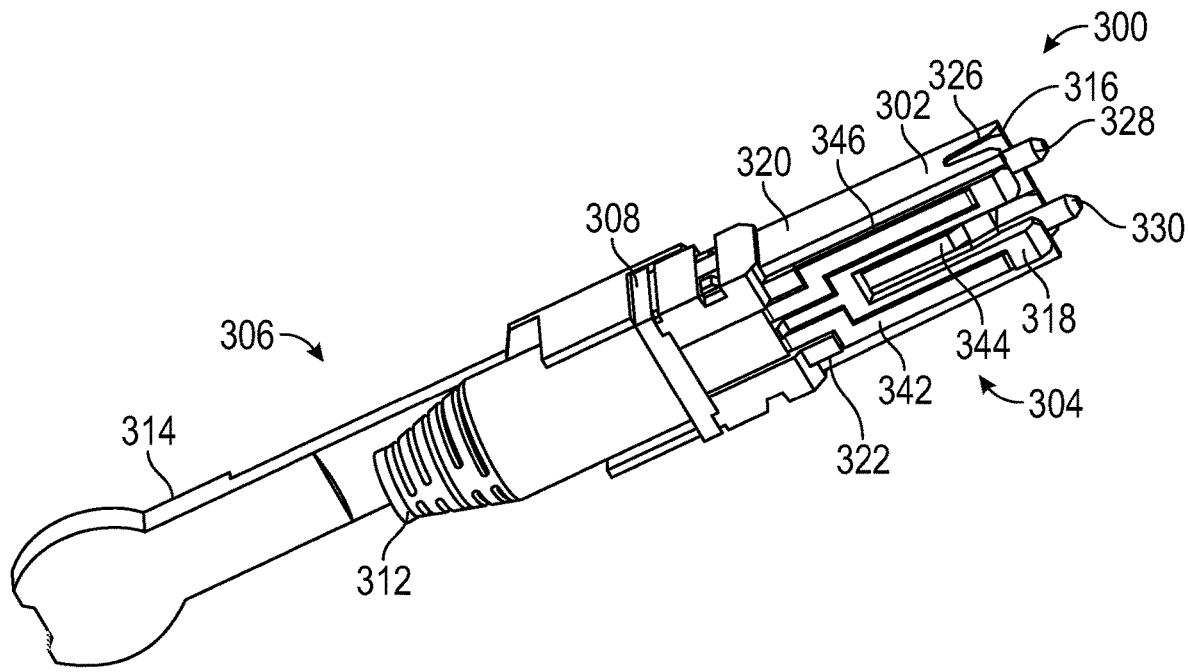
FIG. 18 is a bottom, perspective view of a hybrid fiber connector in an exemplary embodiment.
Figure 19:
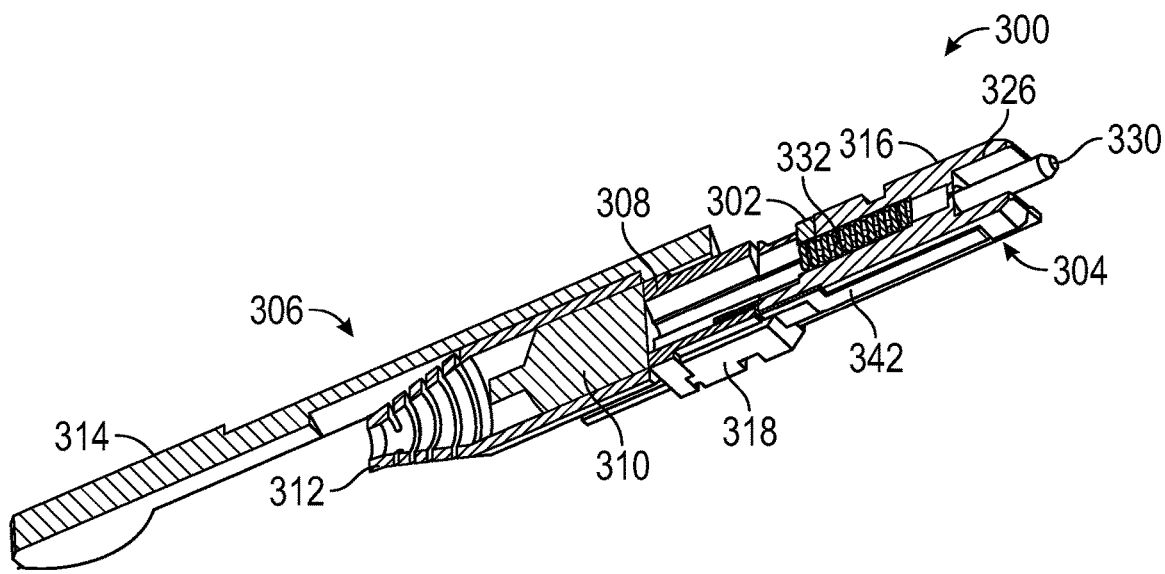
FIG. 19 is a cross-sectional, side view of a hybrid fiber connector of FIG. 18.
Figure 20:
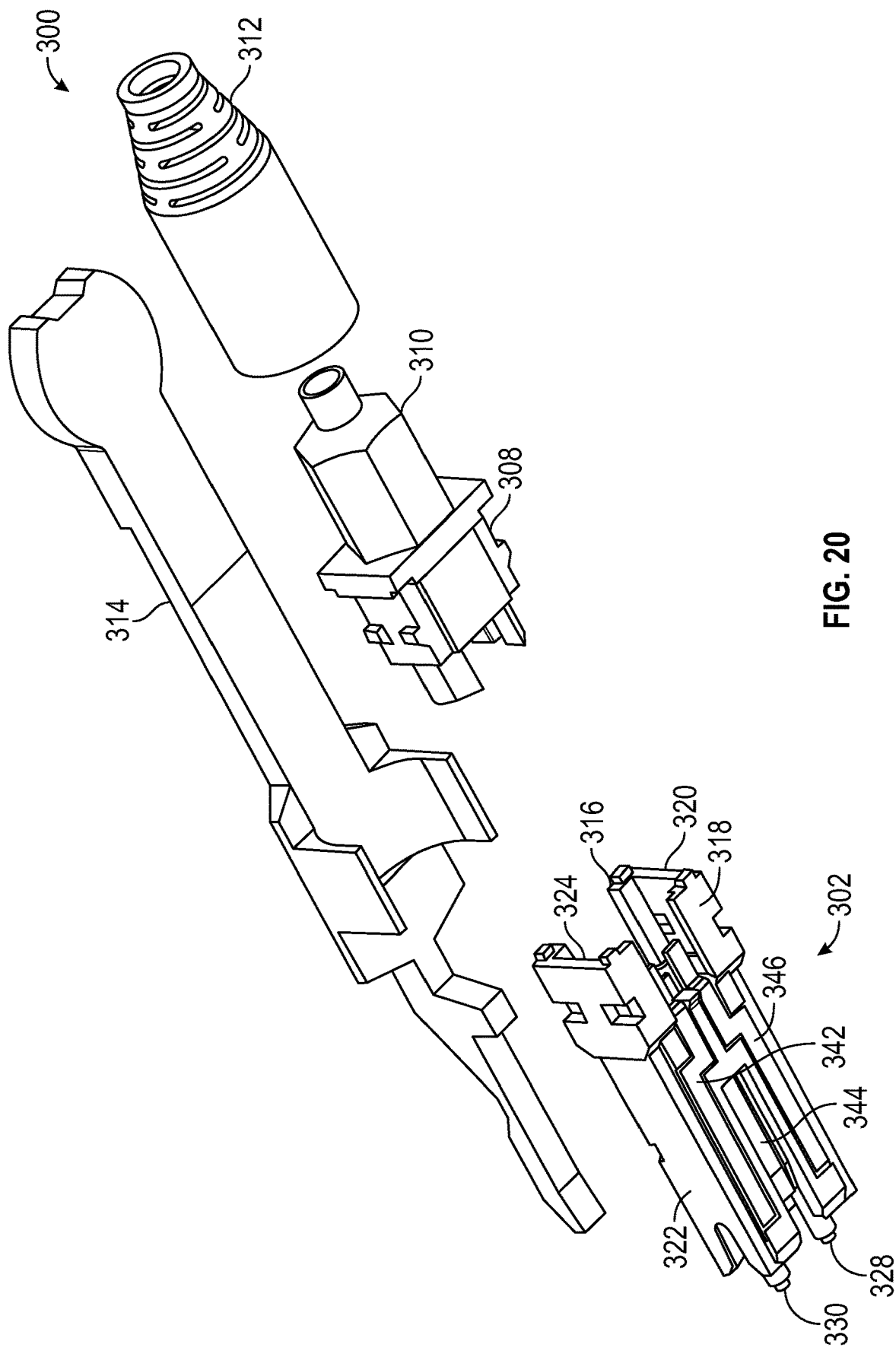
FIG. 20 an exploded, perspective view of a hybrid fiber connector of FIG. 18.
Figure 21:
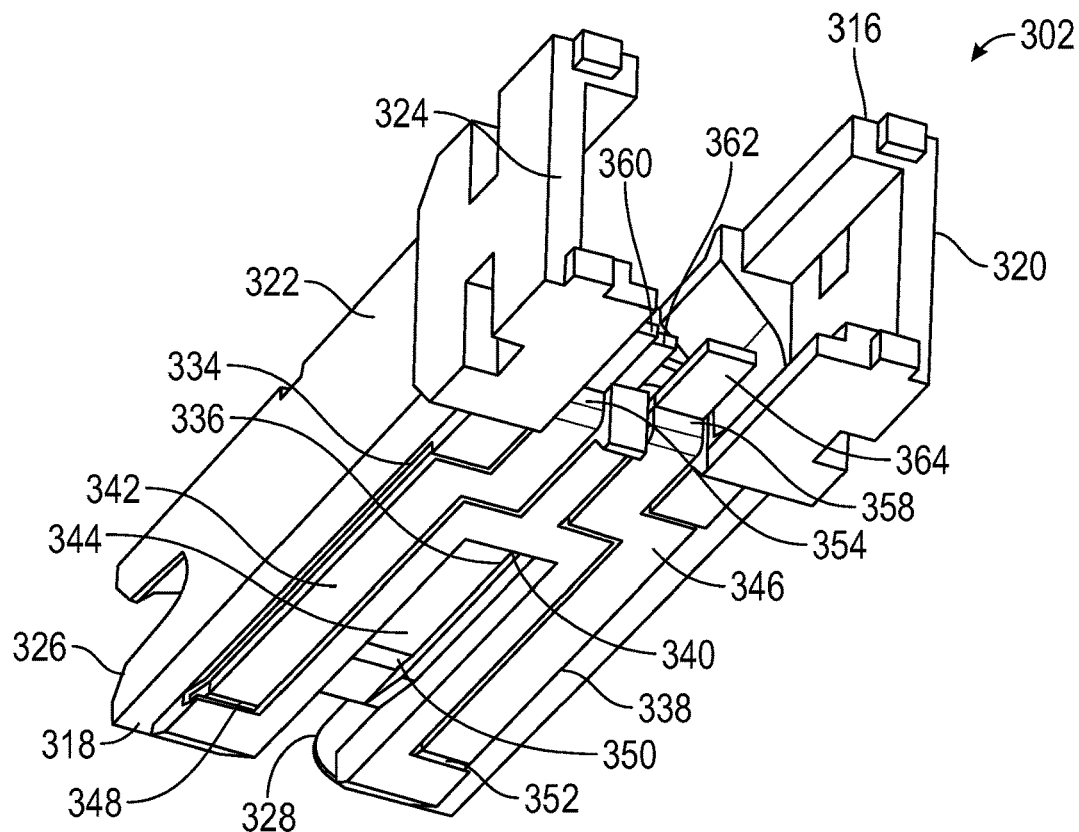
FIG. 21 a bottom, perspective view of a housing of a hybrid fiber connector of FIG. 18.
Figure 22:
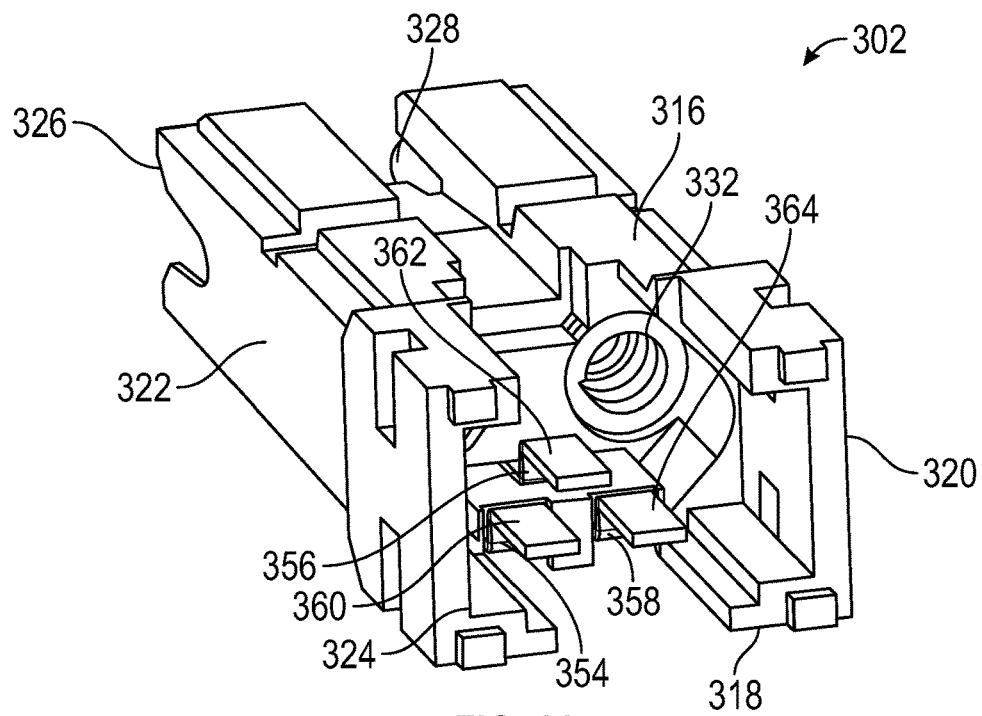
FIG. 22 is a top, perspective view of a housing of a hybrid fiber connector adapter of FIG. 18.

FIGS. 18-20 are perspective, cross-sectional and exploded views of another hybrid fiber connector 300 (hereinafter "connector"), and FIGS. 21-22 are perspective views of a housing 302 associated with the connector 300. The connector 300 can be a duplex connector. The connector 300 generally defines a proximal end 304 and a distal end 306. The connector 300 includes a locking/latching mechanism 314 coupled to the housing 302 for detachably connecting the connector 300 to a complementary port of an adapter (e.g., adapter 400 of FIGS. 23-26). The connector 300 can include an inner subassembly or housing section 308 at least partially disposed within the housing 302 near the distal end 306. The connector 300 includes a crimp section 310 disposed adjacent to the section 308, and a boot 312 disposed over the crimp section 310 and extending distally from the housing 302. Although not illustrated, the crimp section 310 and boot 312 can include a central opening for passage of an optical fiber therethrough.

The housing 302 generally defines a rectilinear configuration, although other configurations are envisioned. The housing 302 includes opposing top and bottom walls 316, 318 that are substantially parallel to each other, and side walls 320, 322 that are substantially parallel to each other. The walls 316, 318, 320, 322 can define substantially planar or flat surfaces. The housing 302 includes a hollow interior configured to receive one or more components and/or optical fibers. The distal end of the housing 302 includes an opening 324 extending into the interior of the housing 302, and configured to at least partially receive the section 308, section 310 and/or boot 312. The proximal end of the housing 302 includes an opening 326 configured and dimensioned to at least partially receive a complementary structure of the adapter 400 to assist with aligning connection of the connector 300 with the adapter 400. The connector 300 includes two laterally spaced ferrules 328, 330 extending from the opening 326 at the proximal end 304 of the connector 300. Each ferrule 328, 330 includes a spring 332 disposed within the interior of the housing 302 and biasing the respective ferrule 328, 330.

The bottom wall 318 of the housing includes three, spaced recessed slots or grooves 334, 336, 338 formed therein. The groove 336 can be substantially linear and disposed centrally relative to grooves 334, 338. The grooves 334, 338 can define a substantially S-shaped, stepped configuration. The grooves 334, 338 lead to the opening 324 at the distal end of the housing 302, and the groove 336 can lead to an opening 340 in the bottom wall 318. At the proximal end, each of the grooves 334, 336, 338 can include an opening extending into the housing 302 either completely into the interior of the housing 302 or in the direction of the interior of the housing 302.

Each of the grooves 334, 336, 338 is configured to receive and retain therein a contact pad 342, 344, 346. The proximal end 348, 350, 352 of the respective contact pad 342, 344, 346 is received in the opening at the proximal end of the grooves 334, 336, 338 to detachably fixate the contact pads 342, 344, 346 relative to the housing 302. At or near the distal end, each of the pads 342, 344, 346 includes a stepped section 354, 356, 358 to elevate the contact pad 342, 344, 346 into the interior of the housing 302, and a distal tab 360, 362, 364 extending from the respective sections 354, 356, 358. The contact pads 342, 344, 346 allow for electrical, copper wiping contact with corresponding contact pads of the adapter 400. In some embodiments, the contact pads 342, 344, 346 can be physically/electrically connected to each other. In some embodiments, the contact pads 342, 344, 346 can be physically/electrically isolated from each other.

Figure 23:
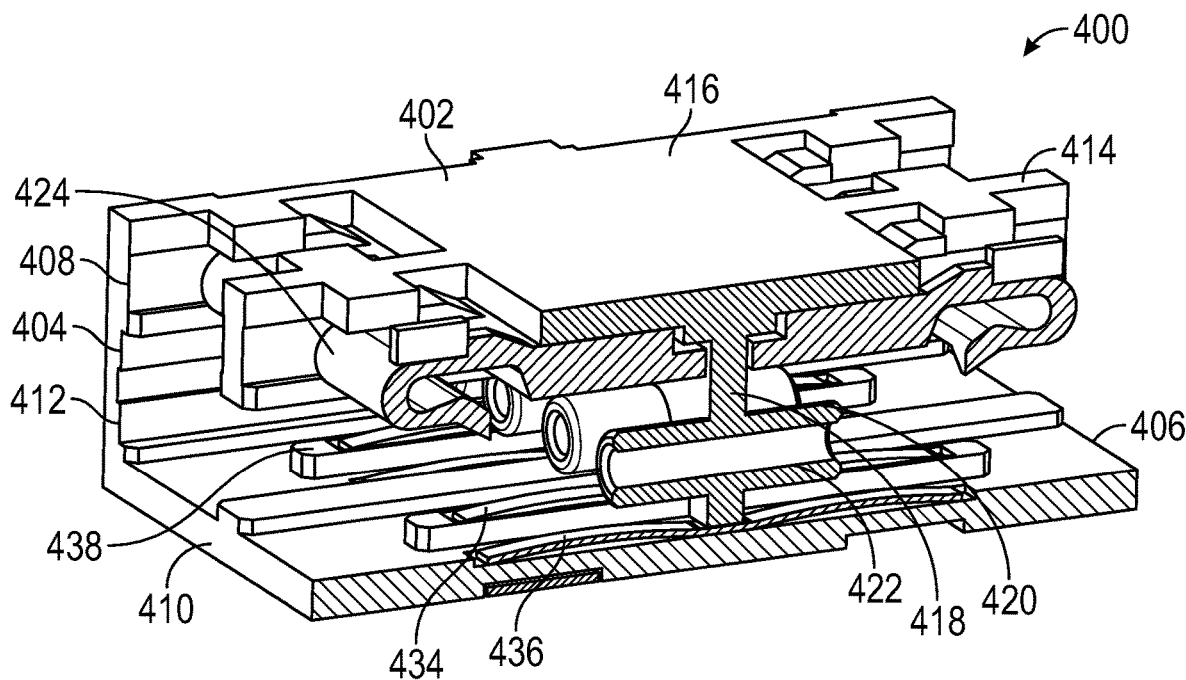
FIG. 23 is a cross-sectional, perspective view of a hybrid fiber connector adapter in an exemplary embodiment.
Figure 24:
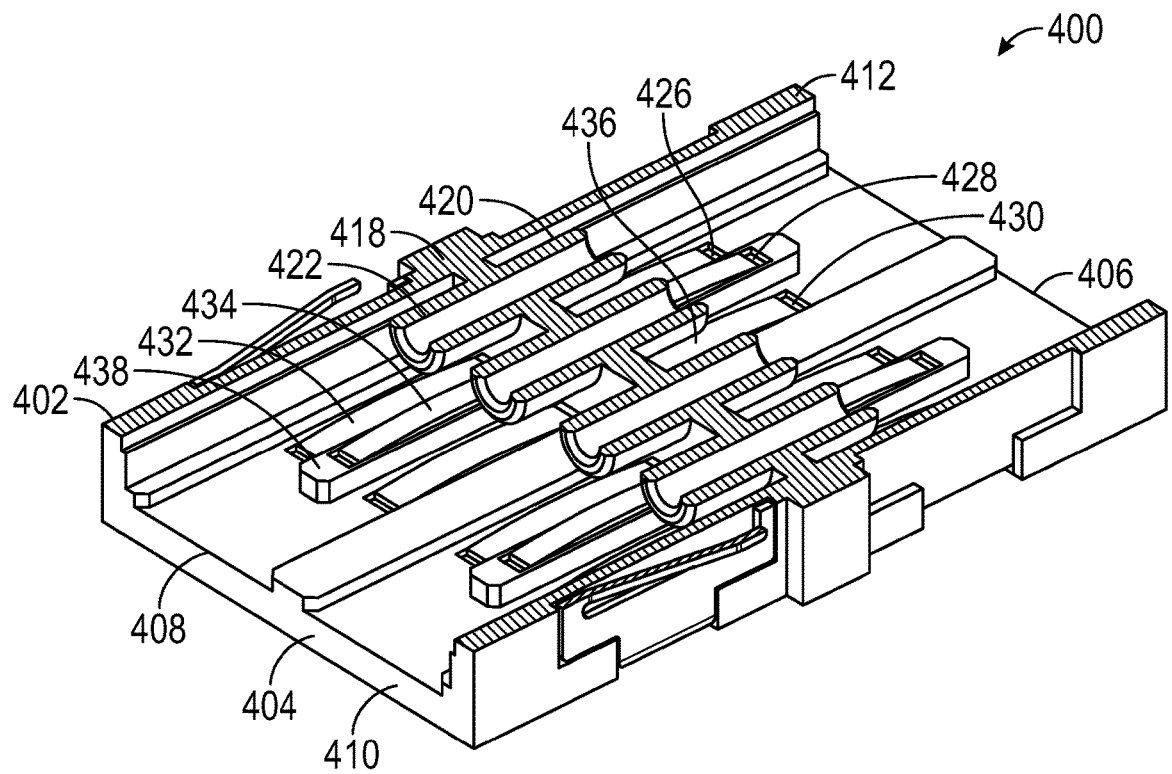
FIG. 24 a cross-sectional, perspective view of a hybrid fiber connector adapter of FIG. 23.

FIGS. 23 and 24 are perspective, cross-sectional views of a hybrid fiber connector adapter 400 (hereinafter "adapter 400") configured to optically and electrically receive and mate with the connector 300. The adapter 400 includes a housing 402 including opposing ends 404, 406. Each end 404, 406 includes one or more openings or ports 408 configured and dimensioned to releasably receive the connector 300. Each port 408 generally includes a bottom wall 410, side walls 412, 414 extending substantially perpendicularly from the bottom wall 410, and a top wall 416. The ports 408 extend from the end 404 to the end 406 of the housing 402.

The housing 402 includes a central wall 418 that extends perpendicularly from the top wall 416 to the bottom wall 410. The housing 402 includes two guides 420 disposed within each port 408 and spaced from each other in a manner complementary to the ferrules 328, 330 of the connector 300. The guides 420 pass through the central wall 418 and, in some embodiments, can be formed integrally with the central wall 418. In some embodiments, each guide 420 can define a substantially cylindrical configuration, and includes a central opening 422 extending between opposing ends. The outer diameter of the guide 420 is dimensioned to be received within the opening 326 of the connector 300, and the diameter of the opening 422 is dimensioned to receive a ferrule 328, 330 such that opposing connectors 300 received by ports 408 of the adapter 400 can be optically connected to each other. The adapter 400 includes a locking/latching mechanism 424 disposed at least partially within the port 408 near the top wall 416 on either side of the central wall 418. The locking/latching mechanism 424 releasably engages with the locking/latching mechanism 314 of the connector 300 to detachably retain the connector 300 within the port 408.

Within the interior of the port 408, the bottom wall 410 includes three recessed slots or grooves 426, 428, 430 formed therein. The grooves 426, 428, 430 extend through the central wall 418, and are each configured and dimensioned to receive an electrical contact pad 432, 434, 436 (e.g., bar contacts, or the like). In some embodiments, the central groove 428 can be formed on an elevated section 438 extending from the bottom all 410 such that the central contact pad 434 is elevated above the contact pads 432, 436. The contact pads 432, 434, 436 allow for electrical, copper wiping contact with corresponding contact pads 342, 344, 346 of the connector 300 during insertion of the connector 300 into the port 408.

Figure 25:
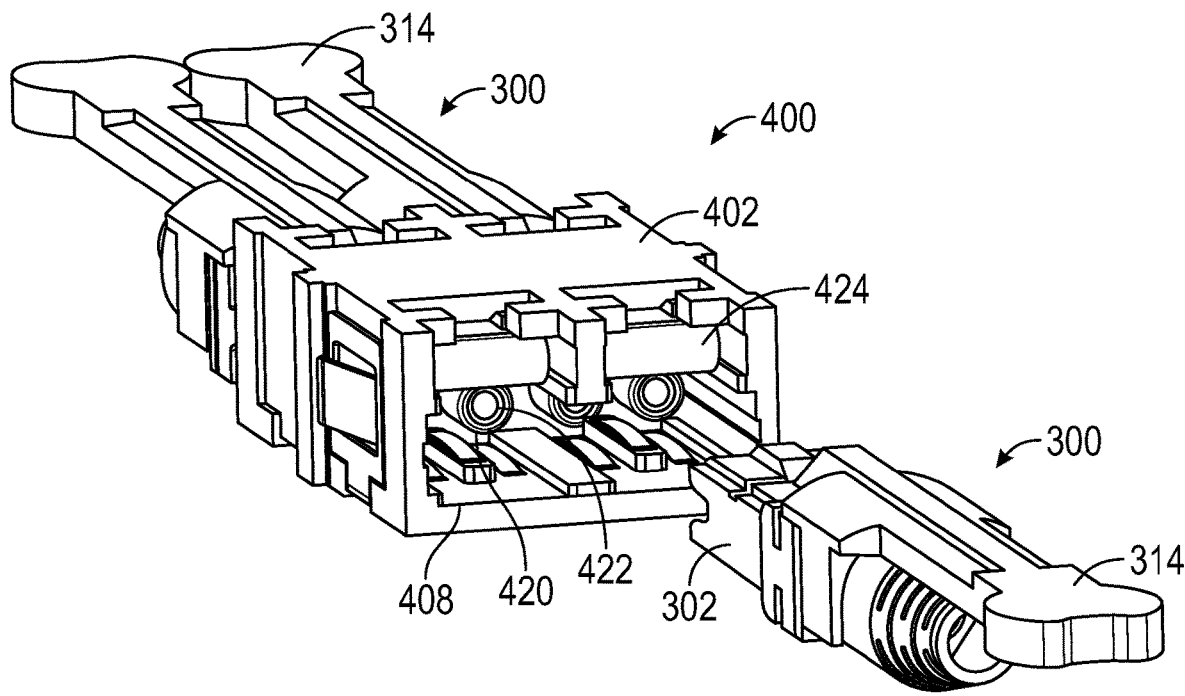
FIG. 25 is a left side, perspective view of a hybrid fiber connector system in an exemplary embodiment, including a hybrid fiber connector of FIG. 18 and a hybrid fiber connector adapter of FIG. 23.
Figure 26:
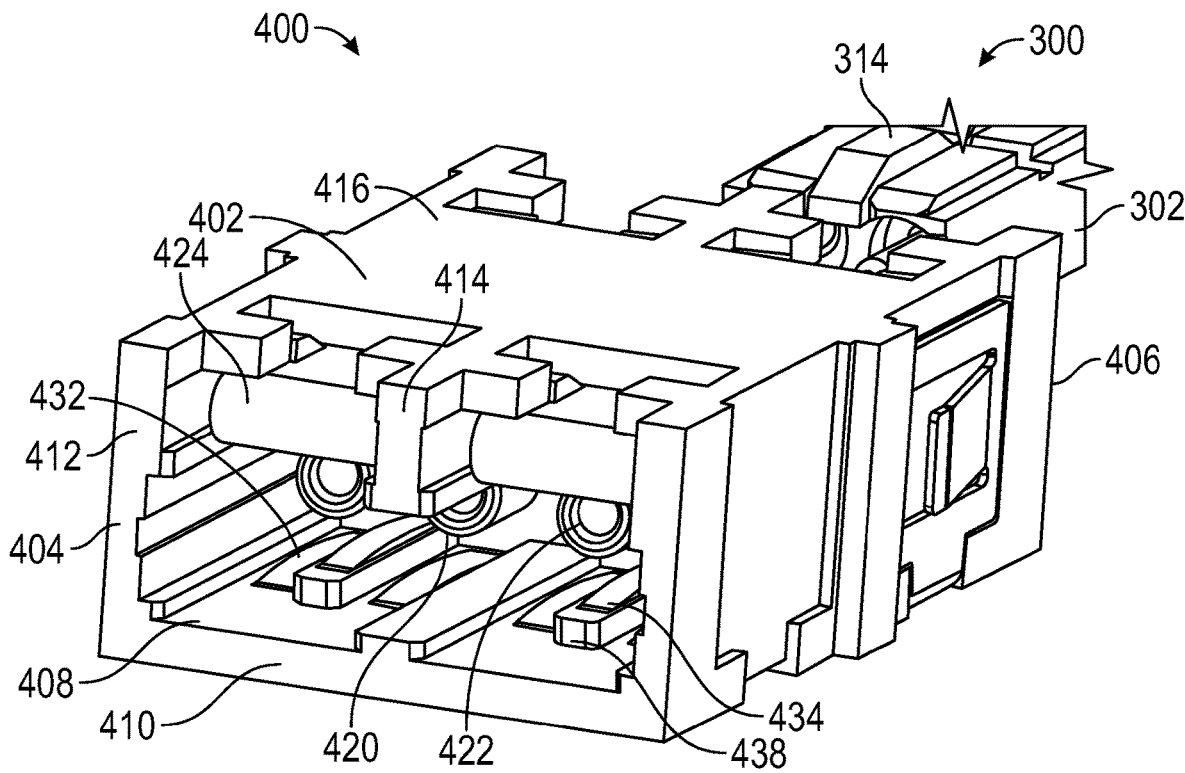
FIG. 26 is a right side, perspective view of a hybrid fiber connector system of FIG. 25.

FIGS. 25 and 26 are perspective views of the adapter 400 and the connector 300 (collectively referred to herein as "a hybrid fiber connector system" or "system"). Upon insertion of the connector 300 into the port 408 of the adapter 400, the ferrules 328, 330 pass at least partially into the opening 422 of the adapter 400. Simultaneously, the contact pad 342 makes electrical, wiping contact with the contact pad 432, the contact pad 344 makes electrical, wiping contact with the contact pad 434, and the contact pad 346 makes electrical, wiping contact with the contact pad 436. When another connector 300 is inserted from the opposing side into the corresponding port 408, an optical connection is created through the ferrules 328, 330 for transmission of data, and an electrical connection is simultaneously created through the contact pads 342, 344, 346, 432, 434, 436 for transmission of power. The system therefore allows for higher bandwidth for fiber data transmission, while simultaneous transfer of power through the copper, electrical connection, resulting in a hybrid connection system without the crosstalk issues typically observed with use of traditional connection systems.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A hybrid fiber connector, comprising:
   a housing defining a proximal end and an opposing distal end, the housing including at least one wall with a first opening and a second opening spaced from the first opening;
   a ferrule disposed at the proximal end of the housing; and
   at least one contact pad coupled to the at least one wall of the housing, wherein the at least one contact pad defines a proximal end and a distal end, and wherein the proximal end of the at least one contact pad extends through the first opening of the housing and the distal end of the at least one contact pad extends through the second opening of the housing to couple the at least contact pad to the at least one wall of the housing;
   wherein upon insertion into a port of a complementary adapter, the ferrule is capable of completing an optical connection and the at least one contact pad is capable of completing an electrical connection.

2. The hybrid fiber connector of claim 1, wherein the housing is a rectilinear housing.

3. The hybrid fiber connector of claim 1, wherein the at least one wall of the housing includes a bottom wall, first and second side walls extending from the bottom wall, and a top wall.

4. The hybrid fiber connector of claim 3, wherein the at least one contact pad includes a first contact pad coupled to bottom wall of the housing, a second contact pad coupled to the first side wall of the housing, and a third contact pad coupled to the second side wall of the housing.

5. The hybrid fiber connector of claim 3, wherein the at least one contact pad includes a first contact pad, a second contact pad, and a third contact pad coupled to the bottom wall of the housing in a spaced manner.

6. The hybrid fiber connector of claim 4, wherein the first, second and third contact pads are electrically and mechanically isolated from each other.

7. The hybrid fiber connector of claim 4, wherein the first, second and third contact pads are electrically and mechanically connected to each other.

8. The hybrid fiber connector of claim 1, wherein the at least one contact pad is a copper, wiping contact pad.

9. The hybrid fiber connector of claim 1, wherein upon insertion into the port of the complementary adapter, the ferrule is capable of completing the optical connection for transmission of data, and wherein upon insertion into the port of the complementary adapter, the at least one contact pad is capable of completing the electrical connection for transmission of power.

10. The hybrid fiber connector of claim 1, wherein the at least one contact pad extends at least partially along an outer surface of the at least one wall of the housing.

11. The hybrid fiber connector of claim 1, wherein the at least one wall of the housing includes a recessed groove configured and dimensioned to receive the at least one contact pad, and wherein the recessed groove receives the at least one contact pad such that an outer surface of the at least one contact pad is aligned with a plane defined by an outer surface of the at least one wall of the housing.

12. A hybrid fiber connector system, comprising:
   an adapter including:
      a housing defining opposing first and second ends;
      a first port formed in the first end of the housing;
      a second port formed in the second end of the housing;
      at least one contact pad coupled to the housing and extending from the first port to the second port; and
      at least one optical guide disposed between the first and second ports within the housing; and
   a hybrid fiber connector including:
      a housing defining a proximal end and an opposing distal end, the housing including at least one wall with a first opening and a second opening spaced from the first opening;
      a ferrule disposed at the proximal end of the housing; and
      at least one contact pad coupled to the at least one wall of the housing, wherein the at least one contact pad defines a proximal end and a distal end, and wherein the proximal end of the at least one contact pad extends through the first opening of the housing and the distal end of the at least one contact pad extends through the second opening of the housing to couple the at least contact pad to the at least one wall of the housing;
   wherein upon insertion of the hybrid fiber connector into the first or second port of the adapter, the ferrule of the hybrid fiber connector is disposed at least partially within the at least one optical guide and is capable of completing an optical connection; and
   wherein upon insertion of the hybrid fiber connector into the first or second port of the adapter, the at least one contact pad of the hybrid fiber connector mates with the at least one contact pad of the adapter and is capable of completing an electrical connection.

13. The hybrid fiber connector system of claim 12, wherein the housing of the adapter includes a bottom wall, a first side wall and a second side wall extending from the bottom wall, and a top wall.

14. The hybrid fiber connector system of claim 13, wherein the at least one contact pad includes a first contact pad coupled to the first side wall of the housing of the adapter, a second contact pad coupled to the bottom wall of the housing of the adapter, and a third contact pad coupled to the second side wall of the housing of the adapter.

15. The hybrid fiber connector system of claim 13, wherein the at least one contact pad includes a first contact pad, a second contact pad, and a third contact pad coupled to the bottom wall of the housing of the adapter in a spaced manner.

16. The hybrid fiber connector system of claim 12, wherein the adapter includes a central wall extending perpendicularly within the housing between the first and second ports, the at least one optical guide extending through the central wall, and wherein the housing includes a recessed groove extending from the first port to the second port through the central wall, the recessed groove configured and dimensioned to receive the at least one contact pad such that the at least one contact pad extends from the first port to the second port through the central wall.

17. A method of transmitting data and power, comprising:
inserting a proximal end of a hybrid fiber connector into a port of a complementary adapter, the hybrid fiber connector including (i) a housing defining the proximal end and an opposing distal end, the housing including at least one wall with a first opening and a second opening spaced from the first opening, (ii) a ferrule disposed at the proximal end of the housing, and (iii) at least one contact pad coupled to the at least one wall of the housing, wherein the at least one contact pad defines a proximal end and a distal end, and wherein the proximal end of the at least one contact pad extends through the first opening of the housing and the distal end of the at least one contact pad extends through the second opening of the housing to couple the at least contact pad to the at least one wall of the housing;
creating an optical connection within the port with the ferrule of the hybrid fiber connector; and
creating an electrical connection within the port with the at least one contact pad of the hybrid fiber connector.

18. The hybrid fiber connector of claim 1, wherein the housing includes an interior and an exterior, and wherein the proximal and distal ends of the at least one contact pad extend through the respective first and second openings of the housing and into the interior of the housing while a central section of the at least one contact pad remains on the exterior of the housing.

19. The hybrid fiber connector of claim 1, wherein the proximal end of the at least one contact pad extends through the first opening of the housing and wraps around a first edge or step in the housing, and the distal end of the at least one contact pad extends through the second opening of the housing and wraps around a second edge or step in the housing.

20. The hybrid fiber connector of claim 19, wherein the distal end of the at least one contact pad wraps around the second edge or step in the housing to define an S-shaped configuration.

* * * * *